May 26, 1942.                A. P. KING                2,283,935
TRANSMISSION, RADIATION, AND RECEPTION OF ELECTROMAGNETIC WAVES
Filed April 29, 1938           5 Sheets-Sheet 1
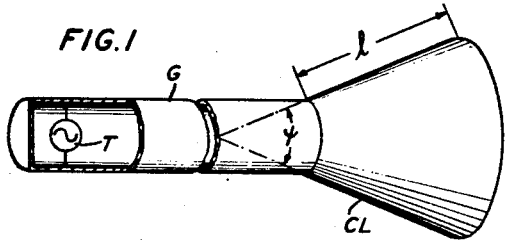
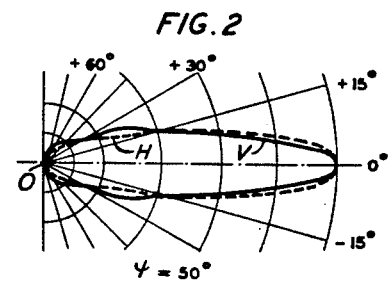
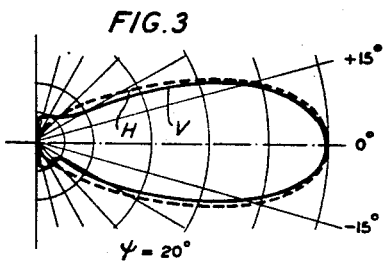
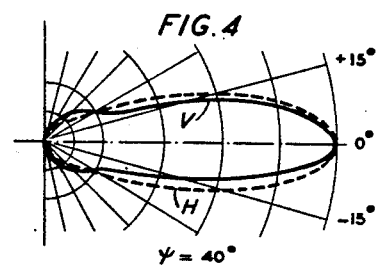
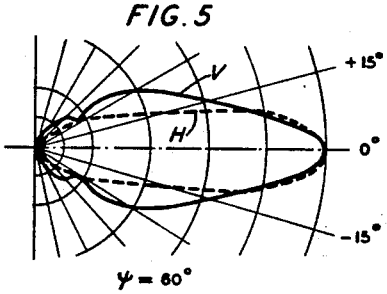
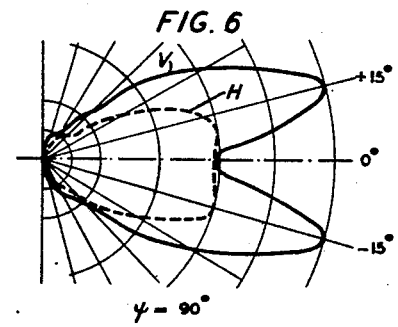
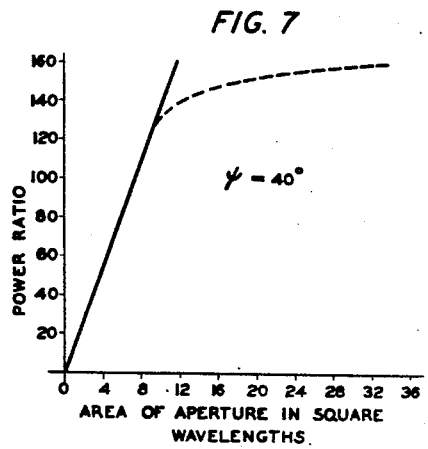
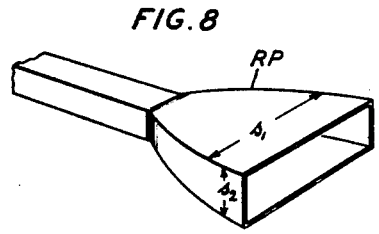
INVENTOR
A. P. KING
BY
N. A. Ewing
ATTORNEY May 26, 1942. A. P. KING 2,283,935
TRANSMISSION, RADIATION, AND RECEPTION OF ELECTROMAGNETIC WAVES
Filed April 29, 1938 5 Sheets-Sheet 2
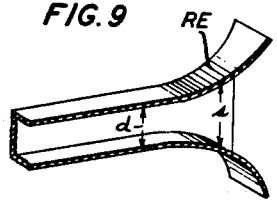
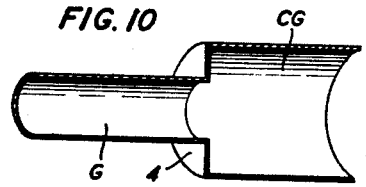
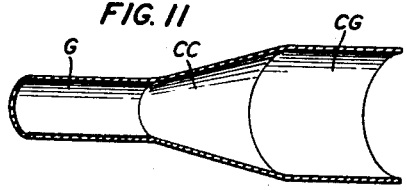
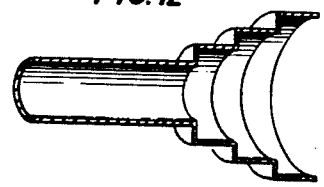
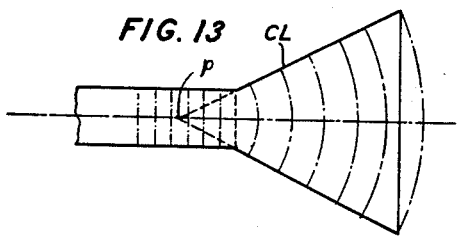
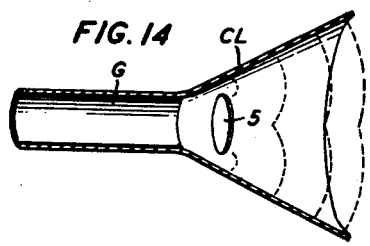
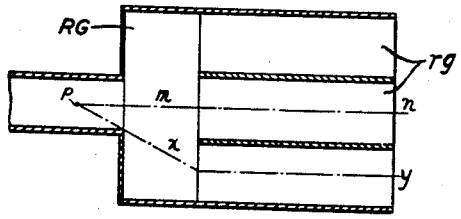
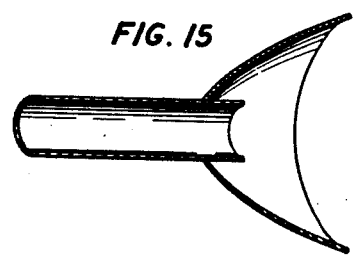
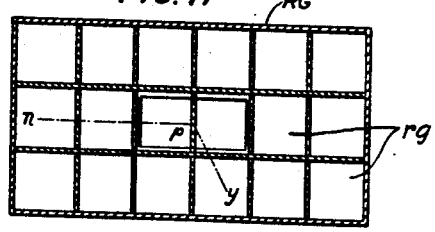
INVENTOR
A. P. KING
BY
N. A. Ewing
ATTORNEY May 26, 1942. A. P. KING 2,283,935
TRANSMISSION, RADIATION, AND RECEPTION OF ELECTROMAGNETIC WAVES
Filed April 29, 1938 5 Sheets-Sheet 3

INVENTOR
A. P. KING
BY
N. A. Ewing
ATTORNEY

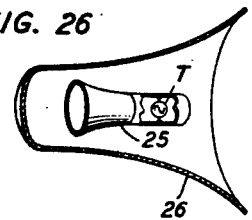
FIG. 26
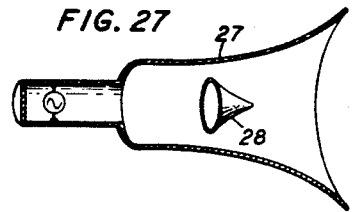
FIG. 27
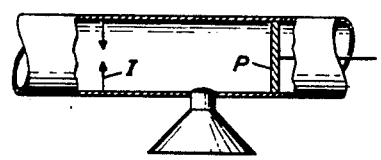
FIG. 28
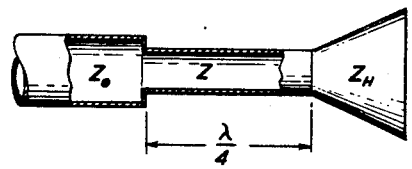
FIG. 29
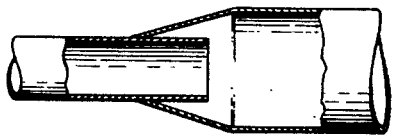
FIG. 30
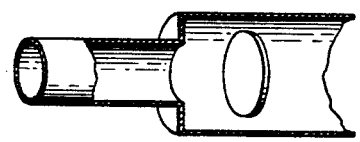
FIG. 31
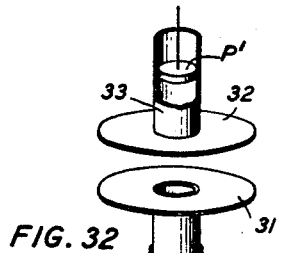
FIG. 32
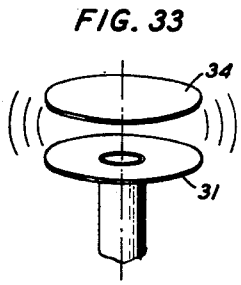
FIG. 33
FIG. 35
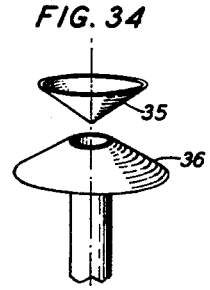
FIG. 34
FIG. 36
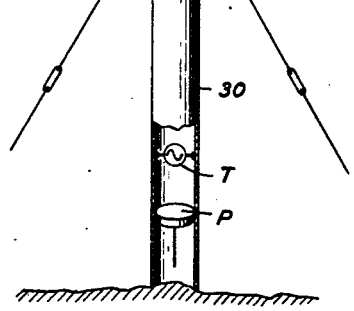
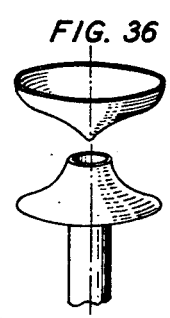

May 26, 1942.  A. P. KING  2,283,935
TRANSMISSION, RADIATION, AND RECEPTION OF ELECTROMAGNETIC WAVES
Filed April 29, 1938  5 Sheets-Sheet 5

INVENTOR
A. P. KING
BY
N. A. Ewing
ATTORNEY

Patented May 26, 1942

2,283,935

UNITED STATES PATENT OFFICE 2,283,935

TRANSMISSION, RADIATION, AND RECEPTION OF ELECTROMAGNETIC WAVES

Archie P. King, Red Bank, N. J., assignor to Bell Telephone Laboratories, Incorporated, New York, N. Y., a corporation of New York Application April 29, 1938, Serial No. 204,960

7 Claims. (Cl. 250—11)

This invention relates primarily to systems and methods for the transmission of electromagnetic waves through space and more particularly to apparatus and methods for the launching of hyper-frequency electromagnetic waves into space and for the reception of such waves.

A principal object of the present invention is to provide new and improved means for the radiation and reception of radio waves. More particular objects are to increase the efficiency with which guided waves and radio waves are interconverted, to secure directive and otherwise non-uniform space distribution of wave power from a high frequency radiator, to secure similar directionally selective properties in radio wave receiving means and to increase the ratio of received energy level to the energy level of extraneous interference, to effect impedance matching between the radiating or receiving means and free space on the one hand and a connected wave guide on the other, and to secure desired directional properties with impedance matching.

The foregoing objects and various other objects are achieved in accordance with the present invention by the various means hereinafter to be described and illustrated in the accompanying drawings. It will be understood that these specific means are only illustrative examples of practice in accordance with the invention and that the invention includes such other means as come within the spirit and scope of the appended claims. Reference will be made to the accompanying drawings, in which:

Figs. 1 and 8 to 12 show simple structures adapted for the interconversion of radio waves and guided waves;

Figs. 2 to 7 and 13 are graphical representations of certain properties of the structure shown in Fig. 1;

Figs. 14 to 22 illustrate modifications adapted for reduction of wave front distortion;

Figs. 23 to 27 show compacted radiating structures;

Figs. 28 and 29 illustrate arrangements for facilitating an impedance match between a wave guide and a horn;

Figs. 30 and 31 depict adaptations of Figs. 14 and 15;

Figs. 32 to 40 show systems and structures adapted for broadcast radiation; and

Figure 18:
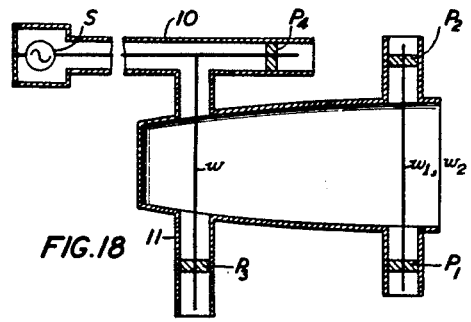

By way of introduction I refer to that prior art which has to do with the transmission of hyper-frequency electromagnetic waves through dielectric guides comprising a metallic pipe containing only air or some other dielectric medium. It is known that there are many types of electromagnetic waves, each characterized by the spacial distribution of its component electric and magnetic fields, which are capable of transmission through such a guide, and it is known, too, that when the end of the pipe distant from the wave source is left open the waves are launched into space and may be received at considerable distances. Conversely, it is known, radio waves of appropriate frequency and polarization impinging on the open end of the pipe can give rise to guided waves therein which can be transmitted to a suitable receiver within the pipe. G. C. Southworth has shown that by suitably flaring the open end of the pipe, that is, by terminating the pipe in some form of horn, one can obtain a better match between the impedance of free space and the characteristic impedance of the pipe guide, so that in the case of a radiator a greater proportion of the guided wave power available within the pipe is converted into radiant wave power, and in the case of a receiver a greater proportion of the intercepted radio wave power is converted into guided wave form. He has found also that such horns serve to modify the directional characteristics of the open-ended pipe as, for example, by largely confining the radiated wave power to a particular direction of transmission or, similarly, by making a receiver selective with respect to the direction of received radio waves.

Referring now to Fig. 1 there is shown a simple combination of wave guide system and horn comprising a cylindrical metallic pipe guide G, of copper or brass, for example, a conical metallic horn CL at the open end of the pipe and means including a high frequency translating device T within the pipe and near the closed end thereof arranged to launch guided waves in the pipe or to receive such waves. The specific nature of the latter means does not enter into the present invention and, generally, any suitable means for launching or receiving guided waves of any particular type mentioned is to be understood. The means illustrated in Fig. 1 is specifically adapted for dielectrically guided waves of the so-called $H_{11}$ or asymmetric magnetic type having lines of electromotive intensity in and roughly parallel to the plane of the paper. The present invention will be described principally with reference to the $H_{11}$ type of wave and this type is to be understood except where other types are specifically indicated. For communication purposes, signals may be impressed on the high frequency waves and any suitable modulation means may be provided for this purpose.

The transverse dimensions of the various structures herein disclosed are generally comparable with the lengths of the waves transmitted, and as an example that will be used throughout this specification the frequency of the wave may be 2000 megacycles per second, corresponding to a free space wave-length of 15 centimeters, and the transverse dimensions of the pipe guide may range from 10 to 15 centimeters. Again it is to be remembered that the ratio of wave-length to dimensions is usually more significant than the absolute dimensions, and the latter may be scaled up or down for correspondingly lower and higher frequencies respectively without great effect on the operation of the system. Although air is treated as the dielectric medium throughout this specification, the various radiating and receiving structures disclosed may alternatively enclose a solid or other dielecteric medium having a dielectric cofficient greater than unity, in which cases the dimensions may be scaled down in proportion to the index of refraction of the dielectric medium. The transmission cut-off characteristic of the pipe guide is not to be forgotten, for it is well known that the transverse dimensions of the pipe must exceed a critical value if a dielectrically guided wave of a particular type and frequency is to be sustained within it.

Copper and brass are suitable materials for construction of the horns herein disclosed, but at the high frequencies contemplated many other materials will serve, and iron coated with zinc or tin has been found quite satisfactory.

Fig. 2 depicts the directional characteristics of a combination of the kind illustrated in Fig. 1; that is, it shows the relative field intensities along different radial lines diverging from the source O.

Curve H applies to points lying in a horizontal plane containing the axis of the horn supposing that the translating device T in Fig. 1 is oriented as there shown, or more generally it applies to points in the magnetic plane, viz., an axial plane that is perpendicular to the lines of electric intensity; and curve V applies to points in the electric plane, viz., an axial plane disposed perpendicularly to the other plane. Fig. 2, it will be appreciated, applies whether the combination is used as a radiator or receiver and in the latter case it indicates the extent to which a receiver would discriminate between waves arriving from different radial directions.

To modify the directional characteristics and to increase the gain of an open-ended pipe guide is one of the objects of the present invention. In the combination shown in Fig. 1 factors affecting the directivity and gain at a given operating frequency are the length $l$ of the horn CL, the conical angle $\psi$ or the rate of flare of the cone, and the area A of the aperture at the larger end of the cone. The directional pattern shown in Fig. 2 applies specifically to a system in accordance with Fig. 1 operated at a frequency of 2000 megacycles per second, comprising a pipe guide of 12.4 centimeters internal diameter, and a conical horn having an angle $\psi$ of 50 degrees and a length $l$ of 39 centimeters. Figs. 3, 4, 5 and 6 show the same characteristic for systems identical with the one just described except that the horns have angles $\psi$ of 20 degrees, 40 degrees, 60 degrees and 90 degrees, respectively. The axial gains for these five horns were found to be 20.0, 16.0, 19.0, 18.7 and 10.8 decibels, respectively, relative to a non-directional source or receiver. The 40 degree horn is fairly directive but has somewhat less power gain than the 50 degree horn, that is, although most of the radiated energy is concentrated in a fairly narrow beam the field intensity at a given distance from the source is less than in the case of the 50 degree horn. Although the 90 degree horn is not as well suited for high gain radiation along the axial direction, it is adapted for transmission in two preferred directions, each 15 degrees removed from the axis, and it is adapted correspondingly for reception along these two directions. So, too, a horn having an angle $\psi$ of roughly 80 degrees does not have maximum gain along the axis but, properly oriented, it is fairly well adapted for transmission or reception uniformly in any direction lying within 15 degrees of the axis, and it can be used where communication is to be had with a plurality of stations lying within this angular range.

I have found that the gain along the axis of a conical horn, expressed as a power ratio $P_r$, conforms approximately with the equation:

$$P_r = \frac{kA \cos \psi}{\lambda^2}$$

where $k$ is a constant, A is the area of aperture in square centimeters, and $\lambda$ represents the free-space wave-length, provided the aperture A does not exceed 10 square wave-lengths. The equation is fairly accurate up to an aperture A of 15 square wave-lengths for values of $\psi$ below 60 degrees. It will be noted that for a given aperture A maximum gain obtains when the conical angle is zero degrees, that is, when the structure comprises only an open-ended pipe guide, and that within the aperture limits stated the gain of such a structure is roughly proportional to the cross-section area of the pipe.

The variables $l$, A and $\psi$ are interdependent in their effect on gain, and if one is fixed, one or both of the others will be found to have an optimum value for maximum gain. When the axial length L of the horn is fixed and greater than a wave-length, the product A cos $\psi$ and likewise the gain, is substantially maximum if the angle $\psi$ is about 60 degrees.

As the aperture of the conical horn is progressively increased, a point is reached where the gain no longer increases proportionately, in accordance with the equation above, but at a slower rate. In some cases the gain quickly approaches an asymptotic limit and does not substantially change with further increase in aperture, and in other cases the gain may actually decrease after reaching an asymptotic or maximum limit. Thus, in a conical horn of favorable angle, where $\psi$ lies between 40 degrees and 60 degrees, little increase in gain is to be had by increasing the length of the horn beyond that corresponding to an aperture of 15 or 20 square wave-lengths, the latter figure being applicable to the 40 degree horn. Otherwise stated, an aperture diameter of from roughly 4½ to 5 wave-lengths is to be preferred inasmuch as a conical horn of larger aperture has but little more gain.

Fig. 7 shows graphically the relation observed between power ratio $P_r$ and aperture A in square wave-lengths for a conical horn of 40 degree angle operated at a free-space wave-length of 15.3 centimeters. The continuous line is a plot of the equation given hereinbefore; the dotted line branching therefrom indicates the departure observed in practice.

In the ideal case, the gain of a horn expressed as a power ratio should increase substantially linearly with its aperture, and the fact that it does not do so in the example just described is attributable to various factors which will be considered hereinafter. At a later point in this specification means will be disclosed for securing a closer approach to the desired linear relation.

Where greater gain and directivity are required than can be obtained with a simple type of horn, a number of such horns may be arranged in an array and energized in the proper phase relation to produce a substantially plane wave front. Preferably the apertures should be no greater than necessary to produce substantially asymptotic or maximum gain.

Although the guide and horn of Fig. 1 have been described as being of circular cross-section, the horn or both horn and guide may be of other cross-sectional shapes, such as rectangular or, more specifically, square. In the latter case, the characteristics of the horn are substantially the same as those of a conical horn of circular cross-section the angle $\psi$ corresponding to the angle between opposite sides. Where the horn is rectangular in cross-section it is preferred that it be arranged with its shorter side parallel to the direction of the electric field, radiated or received, to reduce distortion and the introduction of spurious lobes or ears in the directional pattern.

High directivity and gain can be obtained with horns having other than a linear rate of flare, as for example, where the rate of flare conforms with a parabolic function. Thus, in Fig. 8 is shown a horn RP of rectangular cross-section in which each of the two cross-sectional dimensions $s_1$, $s_2$ varies parabolically with distance $l$ from the junction with the rectangular guide. Favorable results were obtained in one specific case with a horn in which $s_1=\sqrt{4l}$ and $s_2=\sqrt{2l}$. Fig. 9 shows a horn RE of square cross-section and exponential rate of flare, that is, the cross-sectional dimension $s$, corresponding to $s_1$ and $s_2$ in Fig. 8 follows the law, $$s=d+A\cdot(e^{Bl}-1)$$

where A and B are constants, and $d$ represents both dimensions at the smaller end of the horn.

A second species of horn is illustrated in Fig. 10 where the circular metallic pipe guide G is terminated in a short section of pipe CG of greater diameter, connected to the guide by an annular metallic flange 4 or shoulder joint. In general, both directivity and gain increase with the area of aperture, although the rate of increase of gain materially flattens out as the diameter is progressively increased. The departure from a linear rate is presumed to be due to distortion of the wave front, the large geometric discontinuity arising from the abrupt change in diameter at flange 4 being a substantial contributing factor. Preferably the length of the horn should be of the order of a wave-length or more. As a further refinement, the length may be critically adjusted to discourage spurious types of waves resulting from the discontinuity. For this purpose, the flange 4 may constitute a piston adapted to slide within the horn CG, although any other suitable mechanical arrangement could be employed. The cross-section of this horn may be rectangular, in which case it is preferred that the horn be disposed with the electric field parallel to the shorter side of the horn. In one specific embodiment the pipe guide was 10 centimeters in diameter, the horn CG 30.5 centimeters in diameter and 38 centimeters in length, and the operating wave-length 15 centimeters.

Figs. 11 and 12 show two embodiments in which the effect of the geometric discontinuity in Fig. 10 is somewhat reduced. In Fig. 11 a conical connector CC is interposed between the guide and the horn CG. In Fig. 12 the horn is in the form of successively larger sections of pipe interconnected by flanges. The length of these sections may optionally be proportioned to reduce internal reflection within the horn.

The gain of the horns hereinbefore described is a function of the operating frequency, but applicant has found that over a 12 per cent range in frequency the gain in the preferred direction varies no more than one decibel. This characteristic well adapts the horns for transmission and reception of extremely wide signaling frequency bands, such as would be required for high quality television transmission, and also for successive or simultaneous operation at different frequencies within the 12 per cent frequency range.

Simple horns, for example, those considered with reference to Figs. 1 to 10, are not well adapted for operation with large apertures, for with indefinite increase in aperture a decrease in directivity and gain obtain and spurious lobes or ears appear in the directional diagram. These generally undesirable effects are attributed to distortion of the wave front and it is an object of the present invention to correct such effects and to permit the greater gain and directivity that should otherwise be obtainable with horns of large apertures.

One typical form of wave front distortion is represented in Fig. 13, which shows diagrammatically a conical horn CL at the end of a cylindrical pipe guide and the disposition of the lines of electromotive intensity within the horn and guide. It will be supposed in this example and in others that are to follow that the horn is used as a radiator, although it will be understood that analogous conditions obtain in the case of a receiving horn and that a horn favorable for radiation is equally favorable for reception purposes. Within the guide in Fig. 13 the wave front is substantially plane as indicated by the dotted lines of electromotive intensity, and near the throat of the horn the wave front does not depart materially from the planar form. Toward the mouth of the horn, however, the restraint the horn imposes on the waves is not as great and the lines of electromotive intensity in the wave front may tend to bow out in arcuate fashion as shown. This effect is not unexpected inasmuch as waves diverging from a point $p$ in the throat of the horn would travel at about the same velocity in every direction of divergence and would tend to be in phase, thus defining the wave front at successive spherical surfaces centered roughly on point $p$ rather than at successive transverse planes. Considering the matter from a slightly different point of view it may be said that the waves over the elemental areas of the plane aperture of the horn are not in like phase. What is desired, of course, is that the waves issue from the mouth of the horn with a substantially plane transverse wave front.

It may be noted here that where a horn or other structure is used as a receiver, the wave front of the received wave is substantially planar across the mouth of it and that the function of the horn is, at least in part, to converge all portions of the intercepted wave front on the connected guide or other receiving means so that those portions are converged in aiding phase relation. Wave front distortion arising within the receiving structure, if uncorrected, results in some portions of the received wave being combined in out-of-phase relation with consequent relative inefficiency of operation of the receiving system, as for example, lower axial gain and less directivity.

In accordance with the present invention, distortion effects of the kind just described are reduced by selective phasing means for altering the phase relation in which the elemental portions of the wave arrive, in the illustrative case of a radiating structure, at the aperture. In the simple but effective embodiment shown in Fig. 14 a metallic disc 5 is disposed coaxially within the horn CL at a certain distance from the junction of guide and horn. The distance is rather critical for optimum results, but it can readily be adjusted in any particular case with substantial improvement in horn gain and directivity. The dotted lines in Fig. 14 indicate the effect of the disc in retarding wave transmission along and near the axis of the horn whereby a more nearly plane wave front is obtained at the aperture.

As a specific embodiment in accordance with Fig. 14 the internal diameter of the pipe G may be 12.4 centimeters, the angle $\psi$ of the cone 90 degrees, the aperture 3160 square centimeters, the disc 36.5 centimeters diameter, and the operating wave-length 15.3 centimeters. Optimum results are obtained with the disc spaced 18.5 centimeters from the throat of the horn. The size of the disc is substantially optimum for the combination described. Excellent results were obtained in another specific example in which the pipe diameter and frequency were as above, the angle of the cone 50 degrees, the aperture 2360 square centimeters and the disc 21.8 centimeters in diameter spaced 32.8 centimeters from the smaller end of the horn.

In another arrangement that has proved effective in improving the performance of various type of simple horns, the end of the wave guide is extended so that it projects a short distance into the throat of the horn. The optimum distance can readily be determined by trial, especially if the horn is so constructed that it can slide along the guide. Fig. 15 shows one embodiment utilizing a cylindrical pipe guide and a parabolic horn of circular cross-section. Horns of other cross-section, as for example, rectangular, may be used as well.

Selective phasing in accordance with another embodiment of the present invention is obtained by providing in a horn or other similar radiating structure a multiplicity of separate wave guiding paths having different transmission characteristics such that waves passing through them are differently retarded or advanced in phase. By proper correlation of the transmission characteristics of the several paths waves issuing from the mouth of the structure may be made more nearly in phase over the transverse plane, thus yielding greater directivity and gain. A structure so designed is equally advantageous for reception purposes.

In the illustrative example shown in Figs. 16 and 17 the radiating structure comprises a horn RG of the wave guide type, illustrated in another form in Fig. 10, and of rectangular cross-section. Within the horn there is provided a metallic lattice or grating which transversely sub-divides the horn into a multiplicity of separate metallic pipe guides $rg$ of rectangular cross-section. The several guides $rg$ forming the lattice may conveniently be of other cross-sectional shape although the rectangular shape is preferred.

The phase velocity of transmission of waves in a metallic pipe guide is a function of the transverse dimensions, and more particularly for a rectangular guide carrying waves of the $H_{11}$ type the velocity is a function of the dimension at right angles to the electric field. If the transverse dimensions of a rectangular guide are represented by $a$ and $b$, and the lines of electromotive intensity in the guided waves are perpendicular to the sides having dimension $a$, then the wave length $\lambda_p$ within the guide is given by the equation:

$$\lambda_p = \frac{\lambda_a}{\sqrt{1-\left(\frac{\lambda_a}{2a}\right)^2}}$$

where $\lambda_a$ is the corresponding free-space wave-length, all dimensions being in centimeters. The phase velocity is equal to the product of the operating frequency, in cycles per second, and $\lambda_p$.

Referring to the component rectangular guides $rg$ comprising the lattice in Figs. 16 and 17, the phase velocity in each is likewise dependent on the transverse dimension that is at right angles to the lines of electromotive intensity. The respective velocity characteristics of these several component guides are to be so correlated that the time required for a wave to travel from a point $p$ in the throat of the horn through any typical path $pmn$ is substantially the same as the time required for transit of any other such path $pxy$. With the electrical lengths of these paths thus equalized, a more nearly plane wave front is obtained and greater gain and directivity result.

Where a wider range of electrical lengths is required for the various paths $pmn$ etc., the component guides may be made unequal in physical length.

The same transverse dimension that determines the phase velocity in a guide of rectangular cross-section controls also the transmission cut-off frequency; and cut-off occurs at a frequency for which the corresponding free-space wave-length is twice that transverse dimension. The critical dimension of each component rectangular guide in Figs. 16 and 17 should not be so small as to preclude transmission of $H_{11}$ waves, and it is preferred that it be not so great as to permit the transmission of waves of any type other than $H_{11}$.

In an approximate design in accordance with the foregoing principles the horn was 50.6 centimeters by 25.3 centimeters; the grating was 20 centimeters long and spaced 12.7 centimeters from the back or throat of the horn; and the grating comprised two metallic septa parallel to the longer side each spaced 8 centimeters from one wall and 9.3 centimeters from each other, and five metallic septa parallel to the shorter side spaced from one side at intervals of 8, 8.5, 8.8, 8.8, 8.5 and 8 centimeters respectively. Whether the structure be used for radiation or reception, it is preferred that it be so arranged that the waves pass through the component guides $rg$ with the lines of electromotive intensity parallel to the shorter sides rather than the longer.

The application of the selective phasing means shown in Figs. 16 and 17 to the horns shown in Figs. 10 and 11 is immediate and to those skilled in the art the manner of application to horns of conical and other rates and manners of flare will be apparent.

Figure 19:
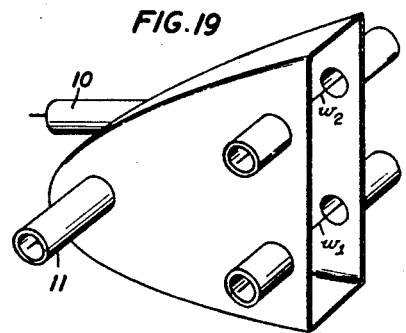

Figs. 18 and 19 show another embodiment of my invention having reactors as selective phasing means within a radiating or receiving horn. In horizontal cross-section the specific horn shown is roughly parabolic, while the top and bottom faces may be parallel or slightly flared as shown in Fig. 18. At or near the optical focal point of the parabola is disposed a vertical wire $w$ which is connected through a suitable circuit to a source or receiver adapted for radio frequency waves. Preferably the wire $w$ is continued outside the horn as the central conductor of a coaxial pair, one end 11 of which is short-circuited by an adjustable piston $P_3$ and the other end of which is connected at an intermediate point to a coaxial line 10 leading to the source or other translating device S. The second line also is provided with a short-circuiting piston $P_4$ so that by adjustment of the two pistons an impedance match can be obtained between the horn, the wire $w$ and its associated circuits.

The combination as above described is an effective one for the directive transmission or reception of radio waves. With respect to the feature now to be described, however, it is only illustrative. In accordance with this feature of the invention, which is capable of embodiment, use and application in widely different systems, there is provided in the path of the electro-magnetic waves one or more reactive or phase-changing means for obtaining a closer approximation to the wave front shape desired, as for example, for reducing the divergence of the wave energy from the preferred direction of transmission. More specifically, a plurality of wires are disposed in the path of the waves and in inductive relation therewith, the wires being spaced apart across the wave path and each having associated with it a certain amount of reactance so that it is effective to relatively advance or retard the portion of the wave front in its immediate vicinity. The nature and amount of reactance associated with each wire are so correlated with reference to the spacing between them and the wave front shape of the incident wave that the wave front assumes more nearly the shape desired.

Referring again to Figs. 18 and 19, within the horn and in the path of waves passing therethrough, preferably near the mouth of the horn, are disposed a plurality of reactors suitable for altering the phase relations between different parts of the waves. Preferably, the reactors comprise conducting wires such as $w_1$ and $w_2$ which are disposed parallel to the wire $w$ and to the lines of electromotive intensity in the transmitted waves. To alter the phase shift introduced by the reactors, each of the wires $w_1$ and $w_2$ may be extended outside the horn as coaxial lines each short-circuited by an adjustable piston $P_1$, $P_2$. The phase shift introduced by these wires depends upon the position of the short-circuiting pistons and such phase shift can be obtained as will at least partially compensate for the effect depicted in Fig. 13. Only two phase shifters are shown, for sake of simplicity of illustration and adjustment, but a greater number can, of course, be employed. Phase shifters of the kind illustrated are treated more fully in my copending application, Serial No. 188,841, filed February 5, 1938, Patent No. 2,232,179, granted February 18, 1941.

Figure 20:
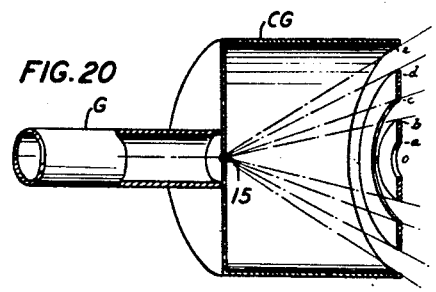
Figure 21:
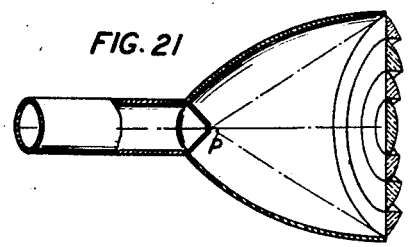
Figure 22:
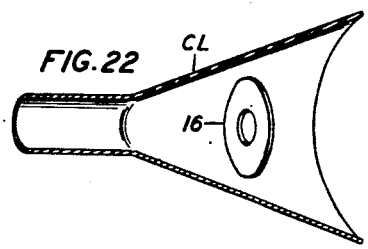

Figs. 20 to 22 show radiating and/or receiving structures utilizing gratings or zone plates for increasing the directivity and gain. In the embodiment shown in Fig. 20 the horn CG at the end of the pipe guide G is of the wave guide type shown in Fig. 10 and circular in cross-section. At the mouth of the horn are a plurality of concentric annular metallic plates $ab$ and $cd$ which are spaced apart to leave annular zones $bc$ and $de$ as well as a central aperture $oa$. Following the principles set forth in U. S. Patent 2,043,347, issued June 9, 1936, to A. G. Clavier et al., the several radii $oa$, $ob$, $oc$, $od$ and $oe$ are so proportioned relative to the free-space wavelength of operation that, in a radiating system, waves issuing from the mouth of the pipe guide are launched into space with a substantially plane wave front, and, in a receiving system, substantially plane waves are converged on the mouth of the pipe in substantially like phase. An iris 15 at the mouth of the pipe aides in simulating the point source or point receiver postulated by theory.

It will be understood that the annular plates in Fig. 20 serve to block out-of-phase wave components. Such components can be effectively utilized if the zone plates are of a dielectric material and of such electrical thickness as to produce a phase reversal, relative to air, of the waves transmitted through them.

The distance between the zone plates in Fig. 20 and the back face of the horn may be critically adjusted for a given operating frequency to increase the amount of power transmitted between the guide and free space, and for the same purpose the pipe guide may be advanced a certain distance into the horn.

In the modification shown in Fig. 21 the mouth of the horn is covered by a modified lens of dielectric material divided into concentric regions each corresponding to one of the zones of a zone plate system. Across each zone the electrical thickness of the dielectric material varies in such manner that all portions of a received wave passing through that zone are combined in exactly aiding phase relation at the point $p$ instead of in the approximately aiding relation obtainable in Fig. 20.

Fig. 22 shows a modification of Fig. 20 comprising a conical horn of circular cross-section and a single annular zone plate 16 for providing phase equalization. The zone plate may be either metallic or of dielectric material in accordance with the principles set forth hereinabove.

Figure 23:
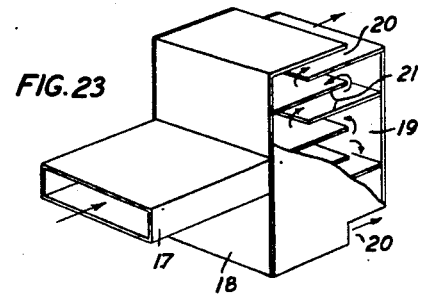

In Fig. 23 is shown a compacted or folded type of radiator or receiver in which the passages successively traversed by the waves are, or may be, of progressively changing cross-sectional area so as to provide a stepped rate of flare as shown, for example, in Fig. 12. Describing the structure with reference to the radiator application, a rectangular guide 17 enters a metallically bounded chamber through one face 18 thereof and extends to within a short distance of the opposite face 19. Above and below the guide are a plurality of metallic baffles 21 coextensive in width with the guide and the chamber, alternate baffles being carried by the respective faces 18 and 19 so as to form a winding passage from the mouth of the guide to the top and bottom rectangular openings 20. The rate of change of the cross-sectional area of this passage depends on the spacing between baffles 21, and it may be made roughly linear, parabolic or otherwise. For operation at a given frequency it may be found desirable to adjust the distance between the faces 18 and 19.

Figure 24:
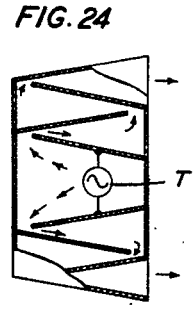
Figure 25:
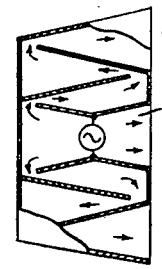

Fig. 24 may be considered as showing a modification of Fig. 23 in which the baffles are outwardly flaring so as to obtain a more nearly linear or smooth rate of flare. In lieu of the guide 17 the source or other translating device T is disposed between the two innermost baffles and arranged for launching waves into the winding passage or for receiving waves therefrom. A further modification is to leave the forward end of the innermost portion of the passage open, flaring it, if desired, as illustrated in Fig. 25, so as to form a forwardly directed passage 22. Circularly symmetric structures having such cross-sectional shapes as are shown in Figs. 24 and 25 represent alternative modifications of Figs. 23 to 25.

Fig. 26 shows a compound horn structure comprising an inner horn 25 with associated translating device T and an oppositely directed outer horn having a base so proportioned as to provide a substantially plane wave front at its aperture.

In Fig. 27 a wave guide at the base of the outer horn 27 replaces the translating device in Fig. 26 and the inner horn is replaced by a deflector 28 which serves to direct waves from the guide to the rear surface of the larger horn.

With regard to the matching of impedance between guide and horn. It is noted that any of the horns shown in Figs 1 to 12 present to the guide an impedance very nearly equal to that of the guide itself. With conical horns having an angle between 30 degrees and 60 degrees, the impedance mismatch at 15 centimeters has been found to amount to about 0.2 decibel which compares favorably with the degree of impedance match obtained in radio frequency wire line practice. Usually a horn which contributes added gain also provides an improved impedance match and is not especially critical as to shape or dimensions.

As an aid to the matching of impedances, arrangements of the kind illustrated in Figs. 28 and 29 may be employed. In Fig. 28 the guide is terminated in a chamber comprising a reactance element in the form of an iris I of adjustable aperture and a metallic piston P, and the horn branches laterally from the chamber thus formed. By proper adjustment of the longitudinal position of piston and iris and of the iris aperture, a combination of adjustments will be found for which the wave power radiated or received through the horn is a maximum.

In Fig. 29 the horn and guide are interconnected by a section of guide having an impedance intermediate that of the other two elements and a length approximately equal to a quarter wavelength or an odd multiple thereof at the operating frequency. Preferably the impedance Z of the quarter wave-length section is equal to the geometric mean of the impedance $Z_H$ of the horn and the characteristic impedance $Z_0$ of the guide.

The selective phasing means hereinbefore described are generally applicable to the solution of another problem, that of reducing wave front distortion occurring at the junction of two pipe guides of different diameters or of different characteristic impedance. Fig. 30 and Fig. 31 illustrate only two of the selective phasing means as applied to the coupling of metallic pipe guides. In Fig. 30 the pipe of larger diameter is tapered down to its junction with the guide of smaller diameter, and the smaller guide projects a short distance into the tapered portion to produce the effect described with reference to Fig. 15. Fig. 31 shows the application of the metallic disc 5 of Fig. 14 to reduction of wave front distortion in guides of different diameter connected by a shoulder or rectangular joint.

The examples of my invention hereinbefore presented have been adapted primarily for selective transmission or reception along one direction, that is, for substantially beam transmission. In accordance with other examples, however, other directional patterns are obtained, as for example, uniform transmission or reception in all horizontal directions.

Referring to Fig. 32 there is shown a radiating or receiving system comprising a vertical metallic pipe guide 30 surmounted with a circular flange 31 at its upper end, opposite which is disposed an annular plate 32 spaced from the flange 31 a distance, comparable with the diameter of the pipe, that is appropriate for the frequency of operation. Near the base of the pipe is the translating device T and associated piston P for launching or receiving guided waves. For simplicity of illustration the device T is shown as one adapted for waves of the $H_{11}$ type. Where uniform transmisison in all horizontal directions is desired, however, it is preferred that $E_{01}$ or $H_{01}$ waves be utilized for transmission through the pipe guide. The same is true of the other broadcast radiators hereinafter disclosed. In lieu of the annular plate 32, a metallic disc 34 may be employed as illustrated in Fig. 33. An annular plate is preferred, however, as it permits a metallically bounded cavity to be formed above it for enhancing radiation. The cavity may conveniently comprise, as shown in Fig. 32, a pipe 33 surmounted at its lower end by the plate 32 and terminated at the other end by an adjustable or fixed reflecting piston P'. Piston P' is adjusted to such position that the radiated field is of maximum intensity. From a theoretical standpoint the arrangement is akin to the impedance matching means disclosed in my Patent No. 2,088,749, August 3. 1937, especially when the radiation resistance associated with the spaced plates is considered.

Modified structures as compared with Figs. 32 and 33 are shown in Figs. 34 to 40, inclusive. In Fig. 34 the disc 34 of Fig. 33 is replaced by an inverted metallic cone 35 axially aligned with the pipe, and the flange 31 of Fig. 33, is replaced by a frusto-conical metallic member 36. In Fig. 35 the radiating elements of Fig. 33 are shown surmounted each with a frusto-conical metallic member 37 disposed so that a path of increasing cross-section is obtained as the wave progresses radially outward. Further modification of the contour of the radial path is indicated in Fig. 36 whereby any desired rate of flare is obtainable.

Figure 37:
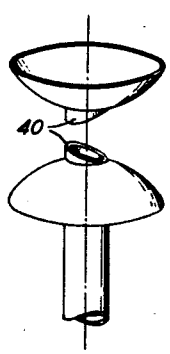

In some cases it is desirable that a radiating structure be capable of transmission in all horizontal directions but that the radiation be greater or less in some directions than in others. Figs. 37 to 40, inclusive, show suitable structures for obtaining a non-uniform radiation pattern. The structure shown in Fig. 37 is in general similar to that shown in Fig. 35, although the members 37 are roughly semispherical. In one horizontal direction radiation is partly suppressed by the arcuate metallic septa 40.

Figure 38:
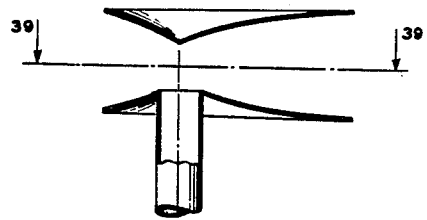
Figure 39:
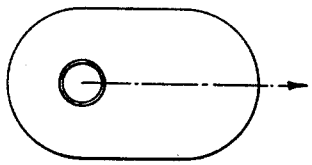

In the modification shown in Figs. 38 and 39 the horn is circularly asymmetric and is of unequal radial length in different directions to provide a corresponding variation in field intensity in the different directions.

Figure 40:
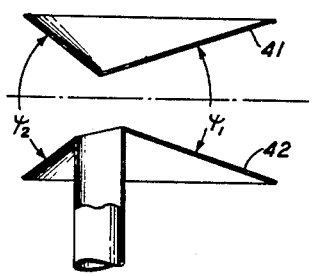
Figure 41:
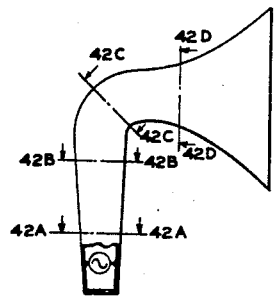
Figs. 41 to 44 illustrate other features and modifications.
Figures 42A, 42B, 42C, 42D:

The broadcast radiator shown in Fig. 40 represents a modification of Fig. 34 in which the radial angle of flare between the metallic members 41 and 42 is different in different radial directions. The angle may change continuously from a value $\psi_1$, to a value $\psi_2$, or in steps, as conditions may require.

In curved wave guides and horns wave front distortion can be reduced by following the principles illustrated in Fig. 41 and Figs. 42A to 42D. These figures show a rectangular guide and a horn of rectangular section coupled thereto which has a curved axis. To compensate for the tendency of the wave front to lag along the outer portion of the curve, because of the greater distance traversed, the transverse dimension of the curved portion may be reduced as indicated in the successive cross-sections comprising Figs. 42A to 42D, thus increasing the phase velocity of transmission along these outer portions and permitting a more nearly vertical wave front to be obtained at the aperture of the horn. The principle involved is similar to that discussed in relation to Figs. 16 and 17, inasmuch as the effect of the transverse dimensions on the plate velocity of propagation is involved in both cases.

Figure 43:
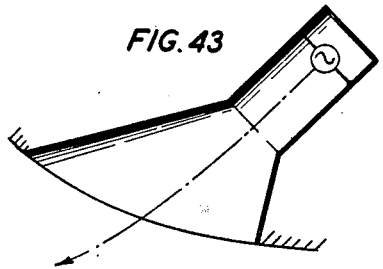
Figure 44:
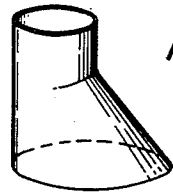

Fig. 43 shows a wave guide terminated in an asymmetric conical horn such that the direction of wave propagation from the horn is not the same as the axial direction of the guide. Fig. 44 shows another form of asymmetric horn having the same characteristic.

What is claimed is:

1. In combination, a wave guide comprising a metallic pipe, a metallic horn connected in axial alignment therewith for the beam radiation or reception of radio waves in the axial direction, and means within said horn in the path of waves transmitted therethrough effectively separating the said waves into a multiplicity of wave guiding paths having different velocities of propagation, whereby the several portions of the wave front are differently accelerated and the directional pattern of said horn modified.

2. In a system for the directive radiation or reception of high frequency electromagnetic waves, the method which comprises separately and concurrently guiding adjacent portions of the wave front of said electromagnetic waves, systematically altering relative to each other the velocities of propagation of the respective wave portions as so guided, whereby the shape of said wave front is modified, and then projecting all of said guided wave portions into coalescing relation to form a unitary wave.

3. The method in accordance with claim 2 in which the said velocities of propagation are systematically altered in such relation to each other as to translate a substantially spherical wave front into a substantially plane wave front.

4. In combination in a system for the beam transmission or reception of radio waves, a source or receiver of ultra-high frequency electromagnetic waves comprising a hollow metallic pipe guide, a metallic extension of said guide leading to an aperture of greater cross-sectional area than said guide and open to free space, and metallic means dividing said extension over at least part of its length into a multiplicity of separate wave guiding passages having different transverse dimensions and correspondingly different velocities of wave propagation so correlated as to compensate for the loss of directivity incident to divergence or convergence of said waves in their passage between said guide and said aperture.

5. A radio transmission system comprising means defining an extended metallic surface shaped as a flaring radiating or collecting device for electromagnetic wave energy, translating means for exciting said device or receiving the wave energy collected thereby, said device having an opening through which said wave energy is radiated or admitted, and means within said device interposed between said translating means and said opening for modifying the directional characteristics of said device, said modifying means including a plurality of individual wave guiding means each proportioned to accelerate an individual part of the wave front of the waves traversing said device relatively to another part of said wave front.

6. A system in accordance with claim 5 in which said modifying means comprises means forming a plurality of passages of different electrical lengths.

7. A system in accordance with claim 5 in which said modifying means includes a multiplicity of metallically bounded passages having different velocities of wave propagation.

ARCHIE P. KING.